United States Patent
Yeo et al.

(10) Patent No.: US 10,979,346 B1
(45) Date of Patent: Apr. 13, 2021

(54) HYBRID HUB-AND-SPOKE COMMUNICATIONS NETWORK WITH HUB-BYPASS COMMUNICATIONS PATHS

(71) Applicant: Charter Communications Operating, LLC, St. Louis, MO (US)

(72) Inventors: Elaine T. H. Yeo, Denver, CO (US); Jeffrey L. Cook, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/802,082

(22) Filed: Feb. 26, 2020

(51) Int. Cl.
| | | |
|---|---|---|
| *H04L 12/703* | (2013.01) | |
| *H04L 12/721* | (2013.01) | |
| *H04L 12/707* | (2013.01) | |
| *H04L 12/24* | (2006.01) | |
| *H04L 12/44* | (2006.01) | |

(52) U.S. Cl.
CPC .............. *H04L 45/28* (2013.01); *H04L 12/44* (2013.01); *H04L 41/0668* (2013.01); *H04L 41/5009* (2013.01); *H04L 45/24* (2013.01); *H04L 45/72* (2013.01); *H04L 2012/445* (2013.01)

(58) Field of Classification Search
CPC .............. H04L 12/44; H04L 2012/445; H04L 41/0668; H04L 41/5009; H04L 45/24; H04L 45/28; H04L 45/72
See application file for complete search history.

(56) References Cited

U.S. PATENT DOCUMENTS

| | | | | |
|---|---|---|---|---|
| 7,940,784 B2* | 5/2011 | Elias | ....................... | H04L 45/32 370/406 |
| 8,625,610 B2* | 1/2014 | Asati | .................... | H04L 63/0272 370/401 |
| 9,674,285 B2* | 6/2017 | Detienne | ............... | H04L 67/142 |
| 9,729,451 B2* | 8/2017 | Hegde | .................... | H04L 47/125 |
| 10,341,140 B2* | 7/2019 | Shen | .................... | H04L 12/4633 |
| 2009/0157901 A1* | 6/2009 | Asati | ....................... | H04L 45/02 709/238 |
| 2020/0252234 A1* | 8/2020 | Ramamoorthi | ......... | H04L 45/64 |

OTHER PUBLICATIONS

Microsoft Docs. "Hub and spoke network topology", May 10, 2019, 5 pages. (Year: 2019).*

(Continued)

*Primary Examiner* — George C Neurauter, Jr.
(74) *Attorney, Agent, or Firm* — Withrow & Terranova, PLLC (57) ABSTRACT

A hybrid hub-and-spoke communications network with hub-bypass communications paths is disclosed. An edge router receives, from a first origination network gateway node, a first packet destined for a first destination network gateway node. The edge router is communicatively coupled to a hybrid hub-and-spoke and hub-bypass data communications network. The edge router determines that the first packet is to be routed to the first destination network gateway node via a first hub-bypass communications path of the hybrid hub-and-spoke and hub-bypass data communications network. The edge router adds one or more segment identifiers to a header of the first packet that defines the first hub-bypass communications path, and sends the header and the first packet to the first spoke router.

20 Claims, 4 Drawing Sheets

(56) References Cited

OTHER PUBLICATIONS

De Camargo, R.S. et al. "Multiple allocation hub-and-spoke network design under hub congestion", Computers & Operations Research 36, available online Oct. 21, 2008, 10 pages. (Year: 2008).*

Filsfils, C. et al., RFC8402 "Segment Routing Architecture," Jul. 2018, 32 pages.

Sivabalan, S. et al., "PCEP Extensions for Segment Routing," Mar. 4, 2019, https://tools.ietf.org/html/draft-ietf-pce-segment-routing-16, 33 pages.

* cited by examiner

HYBRID HUB-AND-SPOKE COMMUNICATIONS NETWORK WITH HUB-BYPASS COMMUNICATIONS PATHS

BACKGROUND

Hub-and-spoke data communication architectures, sometimes referred to as star network architectures, route all traffic from one spoke node to another spoke node through one or more hub nodes. Hub-and-spoke data communication architectures offer several advantages over other types of data communication architectures, such as a ring data communications network or a mesh data communications network. For example, in a hub-and-spoke data communication architecture, if one spoke node, or one communications path, faults, it does not negatively impact the other spoke nodes.

SUMMARY

The embodiments relate to a hybrid hub-and-spoke data communications network that includes hub-bypass communications paths that can be used, for example, to ensure that packet latency requirements are met.

In one embodiment a method is provided. The method includes receiving, by an edge router from a first origination network gateway node, a first packet destined for a first destination network gateway node, wherein the edge router is communicatively coupled to a first spoke router, and the first spoke router is communicatively coupled to each of a plurality of other spoke routers via one or more hub routers, and is communicatively coupled to a second spoke router of the plurality of other spoke routers via a first hub-bypass communications path that does not traverse the one or more hub routers. The method further includes determining, by the edge router, that the first packet is to be routed to the first destination network gateway node via the first hub-bypass communications path. The method further includes adding one or more segment identifiers to a header of the first packet that defines the first hub-bypass communications path. The method further includes sending the header and the first packet to the first spoke router.

In another embodiment an edge router is provided. The edge router includes a memory, and a processor device coupled to the memory. The processor device is configured to receive, from a first origination network gateway node, a first packet destined for a first destination network gateway node, wherein the edge router is communicatively coupled to a first spoke router, and the first spoke router is communicatively coupled to each of a plurality of other spoke routers via one or more hub routers, and is communicatively coupled to a second spoke router of the plurality of other spoke routers via a first hub-bypass communications path that does not traverse the one or more hub routers. The processor device is further configured to determine that the first packet is to be routed to the first destination network gateway node via the first hub-bypass communications path. The processor device is further configured to add one or more segment identifiers to a header of the first packet that defines the first hub-bypass communications path, and send the header and the first packet to the first spoke router.

In another embodiment a computer program product is provided. The computer program product is stored on a non-transitory computer-readable storage medium and includes instructions configured to cause a processor device of an edge router to receive, from a first origination network gateway node, a first packet destined for a first destination network gateway node, wherein the edge router is communicatively coupled to a first spoke router, and the first spoke router is communicatively coupled to each of a plurality of other spoke routers via one or more hub routers, and is communicatively coupled to a second spoke router of the plurality of other spoke routers via a first hub-bypass communications path that does not traverse the one or more hub routers. The instructions are further configured to cause the processor device to determine that the first packet is to be routed to the first destination network gateway node via the first hub-bypass communications path. The instructions are further configured to cause the processor device to add one or more segment identifiers to a header of the first packet that defines the first hub-bypass communications path, and send the header and the first packet to the first spoke router.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Hub-and-spoke data communications networks, sometimes referred to as star data communications networks, route packets from one spoke node to another spoke node through one or more hub nodes. Hub-and-spoke data communications networks offer several advantages over other types of data communications networks, such as a ring data communications network or a mesh data communications network. For example, in a hub-and-spoke data communications network, if one spoke node, or one communications path, faults, the fault does not negatively impact any other spoke nodes. Moreover, spoke nodes can be added or removed to the network without disturbing the overall network. Hub-and-spoke data communications networks often transport heavy volumes of traffic more efficiently and with less latency than ring or mesh data communications networks.

One downside to a hub-and-spoke data communications network arises in the context of a geographically diverse network where relatively large geographic distances may separate nodes. In such large networks, the time delay, referred to as latency, that it takes for a packet of data to travel from a source spoke node to a destination spoke node through the network can be greater than desired. Latency can be particularly problematic, for example, where the packet contains voice data. Excessive packet latency during a real-time conversation can cause abrupt pauses and audio drop-outs, resulting in substantial dissatisfaction among the participants of the conversation.

Even where a hub-and-spoke data communications network may be able to deliver latency-sensitive traffic in a timely manner during normal operating conditions, circumstances may arise, such as the occurrence of a fault in a cable, which will cause the automatic rerouting of traffic along a backup communications path that may no longer meet the latency requirements. Further, a hub-and-spoke data communications network that delivers latency-sensitive traffic in a timely manner during normal operating conditions may fail to do so during periods of congestion.

Figure 1:
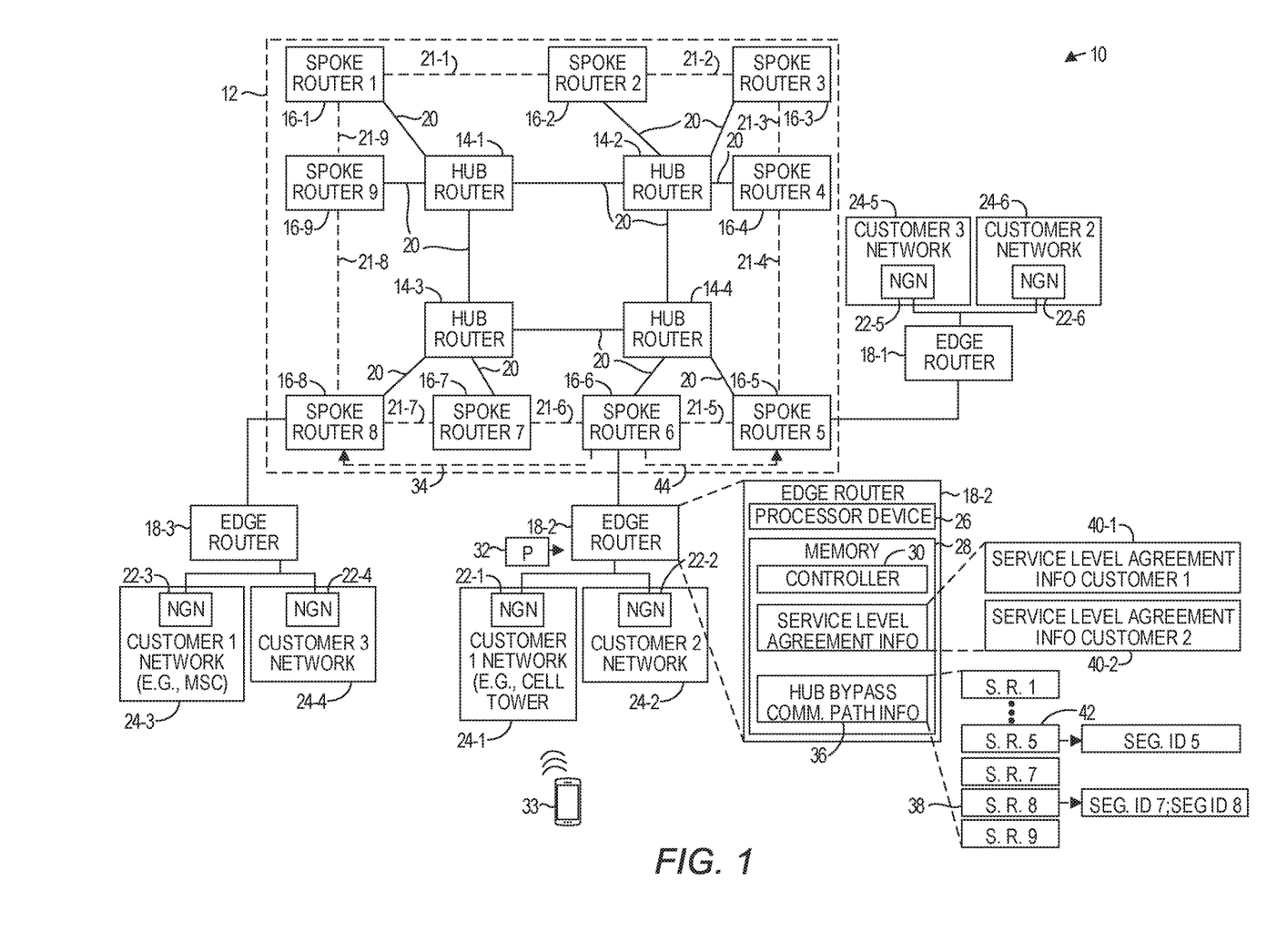
FIG. 1 is a block diagram of a hybrid hub-and-spoke communications network that includes hub-bypass communications paths in accordance with one embodiment.

The embodiments relate to a hybrid hub-and-spoke data communications network that includes hub-bypass communications paths, which, under certain conditions and/or based on certain criteria, facilitate communications between spoke nodes that bypass hub nodes. FIG. 1 is a block diagram of an environment 10 in which embodiments may be practiced. The environment 10 includes a hybrid hub-and-spoke data communications network 12 that includes hub-bypass communications paths (hereinafter "hybrid hub-and-spoke network 12" for the sake of brevity) according to one embodiment. The hybrid hub-and-spoke network 12 includes four hub routers 14-1-14-4, and nine spoke routers 16-1-16-9. The hybrid hub-and-spoke network 12 includes hub-traversing communications paths and hub-bypass communications paths.

As will be described in greater detail below, the spoke routers 16 are communicatively coupled to one or more edge routers, each of which may serve as a source for packets to enter the hybrid hub-and-spoke network 12, as a destination for packets communicated over the hybrid hub-and-spoke network 12 to leave the hybrid hub-and-spoke network 12, or as both a source and a destination for packets. Note that solely for purposes of space, only the spoke routers 16-5, 16-6 and 16-8 are illustrated as being communicatively coupled to edge routers 18-1, 18-2 and 18-3, respectively; however, in practice, each of the spoke routers 16 would typically be communicatively coupled to one or more such edge routers.

Generally, traffic, in the form of packets, is received at one spoke router 16 (e.g., a source spoke router 16) and sent to another spoke router 16 (e.g., a destination spoke router 16) via a hub-traversing communications path. The phrase "hub-traversing communications path" as used herein refers to a communications path from one spoke router 16, such as the spoke router 16-6, to another spoke router 16, such as the spoke router 16-8, that traverses one or more of the hub routers 14, such as the hub routers 14-4 and 14-3. In particular, a packet received at a source spoke router 16 that is destined for a destination spoke router 16 is forwarded by the source spoke router 16 to a hub router 14. The hub router 14 then processes the packet, determines the destination spoke router 16, and forwards the packet either directly to the destination spoke router 16, or to another hub router 14. Note that in some embodiments, communication links 20 between each hub router 14 and an adjacent hub router 14, such as the hub router 14-3 and the hub router 14-4, comprise a single direct-connected communications medium, such as a strand of fiber, or cable, with no routing equipment between the adjacent hub routers 14, although non-routing amplification equipment, such as a repeater that does not analyze the contents of packets, may be utilized where the hub routers 14 are large distances from one another. Similarly, in some embodiments, communication links 21 (discussed in greater detail below) between each spoke router 16 and an adjacent spoke router 16, such as a communication link 21-5 between the spoke router 16-6 and the spoke router 16-5, comprise a single direct-connected communications medium, such as a strand of fiber, or cable, with no routing equipment between the adjacent spoke routers 16, although non-routing amplification equipment, such as a repeater that does not analyze the contents of packets, may be utilized where the spoke routers 16 are large distances from one another.

Hub-and-spoke data communications networks offer several advantages over other types of data communications networks. For example, in a hub-and-spoke data communications network, if one spoke router 16 faults, the fault does not negatively impact any other spoke router 16. Moreover, spoke routers 16 can be added to or removed from the hybrid hub-and-spoke data communications network 12 without disturbing the hybrid hub-and-spoke data communications network 12. Hub-and-spoke data communications networks also typically transport heavy volumes of traffic more efficiently and with less latency than other types of data communications networks.

In some embodiments, the hybrid hub-and-spoke network 12 may be owned and operated by a national service provider that provides services to customers throughout a geographically large country, such as the United States. In such embodiments, the hub routers 14 may be relatively long distances from one another, such as one thousand or more miles apart. When packets are communicated over long distances, latency (i.e., the time it takes for a packet to travel from one node to another node) increases. As an example, a packet received at the spoke router 16-6 destined for the spoke router 16-8 may be communicated by the spoke router 16-6 to the hub router 14-4, from the hub router 14-4 to the hub router 14-3, and from the hub router 14-3 to the spoke router 16-8. The overall geographic distance of that hub-traversing communications path may be thousands of miles. However, the direct physical distance between the spoke router 16-6 and the spoke router 16-8 may be substantially smaller than that of the hub-traversing communications path, and thus, if the packet could be communicated more directly from the spoke router 16-6 to the spoke router 16-8, the latency would decrease.

The embodiments disclosed herein utilize the communication links 21-1-21-9 between the spoke routers 16-1-16-9 to implement, under certain circumstances, hub-bypass communications paths between the spoke routers 16-1-16-9 that bypass the hub routers 14. The phrase "hub-bypass communications path" as used herein refers to a communications path between one spoke router 16 and another spoke router 16 that utilizes one or more of the communication links 21-1-21-9 and that does not traverse any hub router 14. Thus, the hybrid hub-and-spoke network 12 includes traditional hub-traversing communications paths that facilitate a traditional hub-and-spoke network, as well as hub-bypass communications paths for latency-sensitive traffic where routing such traffic via a hub-traversing communications path may cause latency problems.

The edge router 18-2 is communicatively coupled to a network gateway node (NGN) 22-1 that is part of a customer network 24-1. The network gateway node 22-1 may be, for example, a router physically located near one or more other data communications devices that make up the customer network 24-1. The network gateway node 22-1 may, for example, be a gateway router with firewall capabilities, and is configured to determine whether a packet communicated on the customer network 24-1 is destined for another device of the customer network 24-1, or is destined for a device that is outside of the customer network 24-1. The network gateway node 22-1 routes packets that are destined for a device that is outside of the customer network 24-1 to the edge router 18-2 for communication over the hybrid hub-and-spoke network 12 to some destination network gateway node 22. Merely as an example, the customer network 24-1 may include a cell tower and other related equipment, such as a base station or the like, and may communicate with mobile devices (not illustrated) that are within a cell coverage area of the cell tower. The communications may include the receipt of voice and data packets from the mobile device, and the transmission of voice and data packets to the mobile device.

The edge router 18-2 may also be communicatively coupled to a network gateway node 22-2 that is part of a customer network 24-2. The customer networks 24-1 and 24-2 may be owned by different customers. While only two customer networks 24-1-24-2 are illustrated as being communicatively coupled to the edge router 18-2, in practice, the edge router 18-2 serves as an aggregation router, and may be coupled to any number of customer networks 24.

The edge router 18-3 is communicatively coupled to a network gateway node 22-3 that is part of a customer network 24-3. The customer that operates the customer network 24-3 may be the same customer that operates the customer network 24-1. Merely as an example, the customer network 24-3 may include a mobile switching center (MSC) that receives packets from cell towers, such as the cell tower in the customer network 24-1, and processes and routes such packets to appropriate downstream destinations (not illustrated). The routing of packets from the cell tower in the customer network 24-1 to the mobile switching center (MSC) in the customer network 24-3 is sometimes referred to as mobile backhaul, and can include latency sensitive voice traffic. The edge router 18-3 may also be communicatively coupled to a network gateway node 22-4 that is part of a customer network 24-4.

The edge router 18-1 is communicatively coupled to a network gateway node 22-5 that is part of a customer network 24-5, and to a network gateway node 22-6 that is part of a customer network 24-6.

Each network gateway node 22-1-22-6 may, when sending a packet to another network gateway node 22-1-22-6 via the hybrid hub-and-spoke network 12, be referred to herein as an originating network gateway node 22-1-22-6. Each network gateway node 22-1-22-6 may, when receiving a packet from another gateway node 22-1-22-6 via the hybrid hub-and-spoke network 12, be referred to herein as a destination network gateway node 22-1-22-6.

The edge router 18-2 includes a processor device 26 and a memory 28. The memory 28 includes a controller 30 which implements certain of the functionality described herein. However, it should be noted that because the controller 30 is a component of the edge router 18-2, functionality implemented by the controller 30 may be attributed to the edge router 18-2 generally. Moreover, in examples where the controller 30 comprises software instructions that program the processor device 26 to carry out functionality discussed herein, functionality implemented by the controller 30 may be attributed herein to the processor device 26.

The controller 30 receives a packet 32 from the network gateway node 22-1 that is destined for the network gateway node 22-3. Specifically, in this example, the packet 32 comprises voice data generated by a mobile device 33 communicatively coupled to the cell tower of the customer network 24-1. The controller 30 determines that the packet 32 is to be routed to the network gateway node 22-3 via a hub-bypass communications path 34 that comprises the communication link 21-6 and the communication link 21-7, and which does not traverse any of the hub routers 14-1-14-4. Mechanisms for making this determination will be discussed in greater detail below.

The controller 30 adds one or more segment identifiers to a header of the packet 32. The header may be generated by the controller 30, or, in some circumstances, may already exist. In some embodiments, the header may be referred to as a routing header. In some embodiments, the controller 30 utilizes a Multi-Protocol Label Switching (MPLS) Segment Routing architecture as defined in RFC8402 "Segment Routing Architecture," although the embodiments are not limited to any particular segment routing architecture. Segment routing uses an ordered list of segments appended to the packet header. Each segment may be encoded as an MPLS label, and the segments together identify a path through the hybrid hub-and-spoke network 12, in this case, the hub-bypass communications path 34. The controller 30 then sends the packet header and the packet 32 to the spoke router 16-6. Note that in this particular example, the controller 30 may add a plurality of segment identifiers to the packet header, to identify the path from the spoke router 16-6 to the spoke router 16-7 and the spoke router 16-8. The spoke router 16-8 then delivers the packet 32 to the network gateway node 22-3. The segment identifiers may identify the spoke routers 16-6, 16-7, and 16-8, the communication links 21-5, 21-6, and 21-7, or a combination thereof.

In some embodiments, the memory 28 may contain hub-bypass communications path information 36 that identifies hub-bypass communications paths between the edge router 18-2 and each other edge router 18. In this example, the hub-bypass communications path information 36 includes an entry 38 that identifies the segment identifiers necessary to route the packet 32 via the hub-bypass communications path 34 to the spoke router 16-8 for delivery to the network gateway node 22-3. The controller 30 extracts the segment identifiers from the entry 38, generates a list of the segment identifiers, and inserts the list into a routing header of the packet 32.

In some embodiments, the different customer networks 24-1-24-6 may have corresponding criteria that may be used by an edge router 18-1-18-3 to determine whether a packet received by an edge router 18-1-18-3 from a network gateway node 22 is to be routed through the hybrid hub-and-spoke network 12 via a hub-traversing communications path, or via a hub-bypass communications path. In some embodiments, the criteria may be identified in service level agreement information accessible by the respective edge router 18-1-18-3, such as, for example service level agreement information 40-1, contained in the memory 28, which corresponds to the customer associated with the customer network 24-1, and service level agreement information 40-2, contained in the memory 28, which corresponds to the customer associated with the customer network 24-2. In some embodiments, the operator of the hybrid hub-and-spoke network 12 may charge different fees for packets carried over a hub-bypass communications path than for packets carried over a hub-traversing communications path.

The criteria may comprise any suitable criteria or conditions. For example, the service level agreement information 40-1 may contain information that indicates that all packets received from the customer network 24-1 are to be communicated by a hub-bypass communications path. Alternatively, the service level agreement information 40-1 may indicate that each packet must be delivered to the destination network gateway node within a predetermined amount of time, and the controller 30 may utilize real-time conditions to determine whether or not to route a packet through the hybrid hub-and-spoke network 12 via a hub-bypass communications path to ensure compliance. The service level agreement information 40-1 may indicate that certain types of traffic, such as packets carrying voice data, are to be routed through the hybrid hub-and-spoke network 12 utilizing a hub-bypass communications path, and packets carrying non-voice data are to be routed through the hybrid hub-and-spoke network 12 utilizing a hub-traversing communications path.

In this example, assume that the edge router 18-2 receives the packet 32 and, because the packet 32 was received from the network gateway node 22-1 associated with the customer network 24-1, accesses the service level agreement information 40-1. The service level agreement information 40-1 indicates that packets carrying voice data are to be routed via a hub-bypass communications path to the customer network 24-3, and that packets carrying non-voice data are to be routed via a hub-traversing communications path. The controller 30 determines that the packet 32 comprises voice data, and in response, as discussed above, adds the appropriate segment identifiers to route the packet to the spoke router 16-8 via the hub-bypass communications path 34.

For purposes of illustration, assume that the edge router 18-2 next receives another packet (not illustrated) from the network gateway node 22-1. The controller 30 accesses the service level agreement information 40-1 which indicates that packets carrying voice data are to be routed via a hub-bypass communications path to the customer network 24-3, and that packets carrying non-voice data are to be routed via a hub-traversing communications path. The controller 30 determines that the packet 32 comprises non-voice data, and in response, may simply send the packet to the spoke router 16-6 for routing to the spoke router 16-8 via a hub-traversing communications path. Thus, in one embodiment, the spoke router 16-6 may route any packet that does not include a routing header that contains one or more segment identifiers via a hub-traversing communications path. In other embodiments, all routing may be via the use of segment identifiers, and the edge router 18-2 may, after determining that a packet is to be routed via a hub-traversing communications path, insert a list of segment identifiers in a routing header of the packet that causes the packet to be routed over the hybrid hub-and-spoke network 12 via a hub-traversing communications path.

The edge router 18-2 may process packets received from the network gateway node 22-2 similarly. For example, the edge router 18-2 may receive a packet from the network gateway node 22-2, access the customer service level agreement information 40-2, and, based on some criteria identified therein, determine that the packet is to be routed to the network gateway node 22-6 of the customer network 24-6 via a hub-bypass communications path. The edge router 18-2 accesses an entry 42 of the hub-bypass communications path information 36 and determines that a hub-bypass communications path 44 exists to the spoke router 16-5. The edge router 18-2 extracts the segment identifier identified in the entry 42 and inserts the segment identifier into a packet header of the packet. The edge router 18-2 then sends the packet and the packet header to the spoke router 16-6 for communication to the spoke router 16-5, where the packet can be delivered to the edge router 18-1 and ultimately the customer network 24-6 without traversing any of the hub routers 14-1-14-4.

The edge router 18-2 may receive another packet from the network gateway node 22-2, access the customer service level agreement information 40-2, and, based on some criteria identified therein, determine that the packet is to be routed to the network gateway node 22-6 of the customer network 24-6 via a hub-traversing communications path. The edge router 18-2 then sends the packet to the spoke router 16-6 without any segment identifiers. The spoke router 16-6 routes the packet to the spoke router 16-5 via the hub router 14-4.

Figure 2:
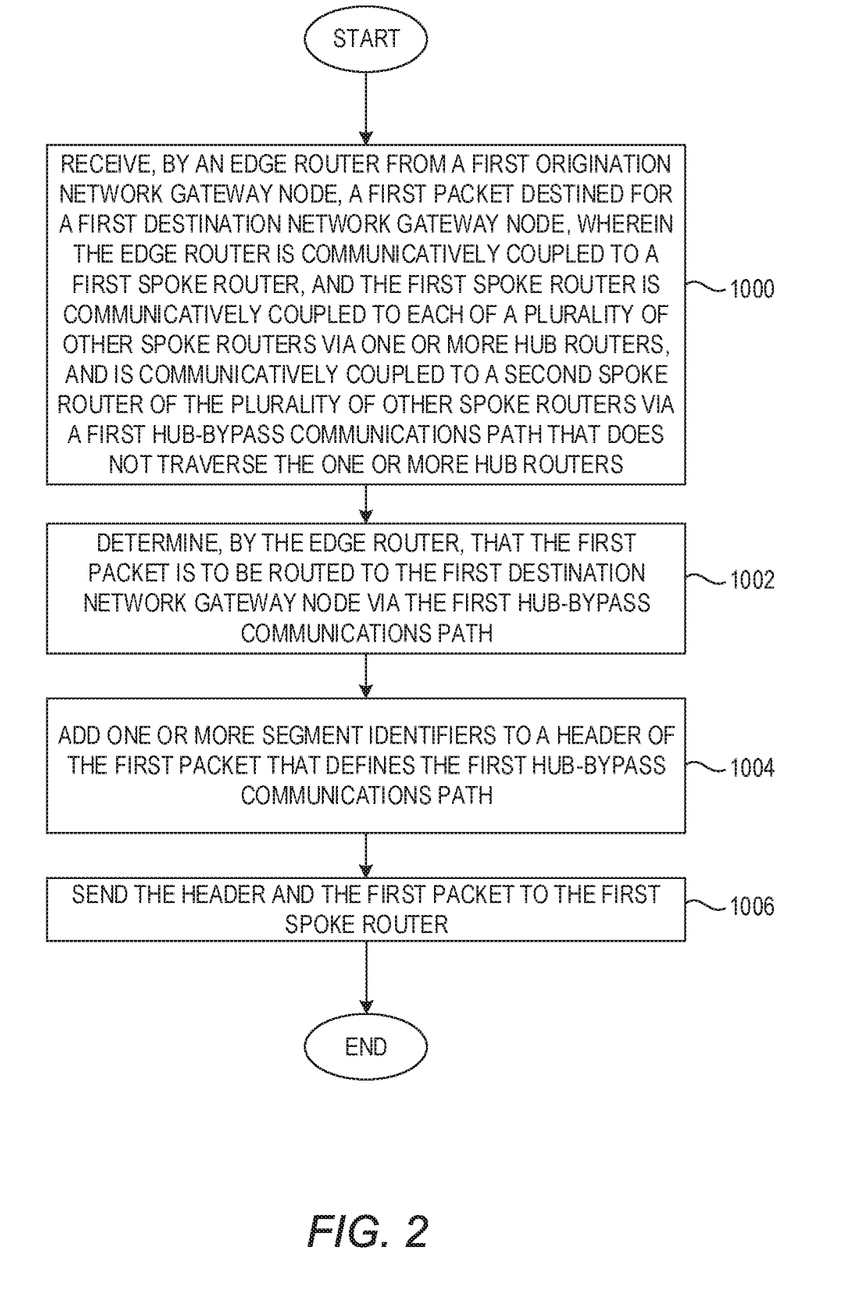
FIG. 2 is a flowchart illustrating a method for routing a packet via a hub-bypass communications path in a hybrid hub-and-spoke communications network that includes hub-bypass communications paths according to one embodiment.

FIG. 2 is a flowchart of a method for routing a packet via a hub-bypass communications path in a hybrid hub-and-spoke data communications network that includes hub-bypass communications paths according to one embodiment. FIG. 2 will be discussed in conjunction with FIG. 1. The edge router 18-2 receives, from the origination network gateway node 22-1, the packet 32 destined for the destination network gateway node 22-3, wherein the edge router 18-2 is communicatively coupled to the spoke router 16-6, and the spoke router 16-6 is communicatively coupled to each of the plurality of other spoke routers 16-1-16-5 and 16-7-16-9 via the one or more hub routers 14-1-14-4, and is communicatively coupled to the spoke router 16-8 via the hub-bypass communications path 34 that does not traverse the one or more hub routers 14-1-14-4 (FIG. 2, block 1000). The edge router 18-2 determines the packet 32 is to be routed to the destination network gateway node 22-3 via the hub-bypass communications path 34 (FIG. 2, block 1002). The edge router 18-2 adds one or more segment identifiers to a header of the packet 32 that defines the hub-bypass communications path 34 (FIG. 2, block 1004). The edge router 18-2 sends the header and the first packet to the first spoke router (FIG. 2, block 1006).

Figure 3:
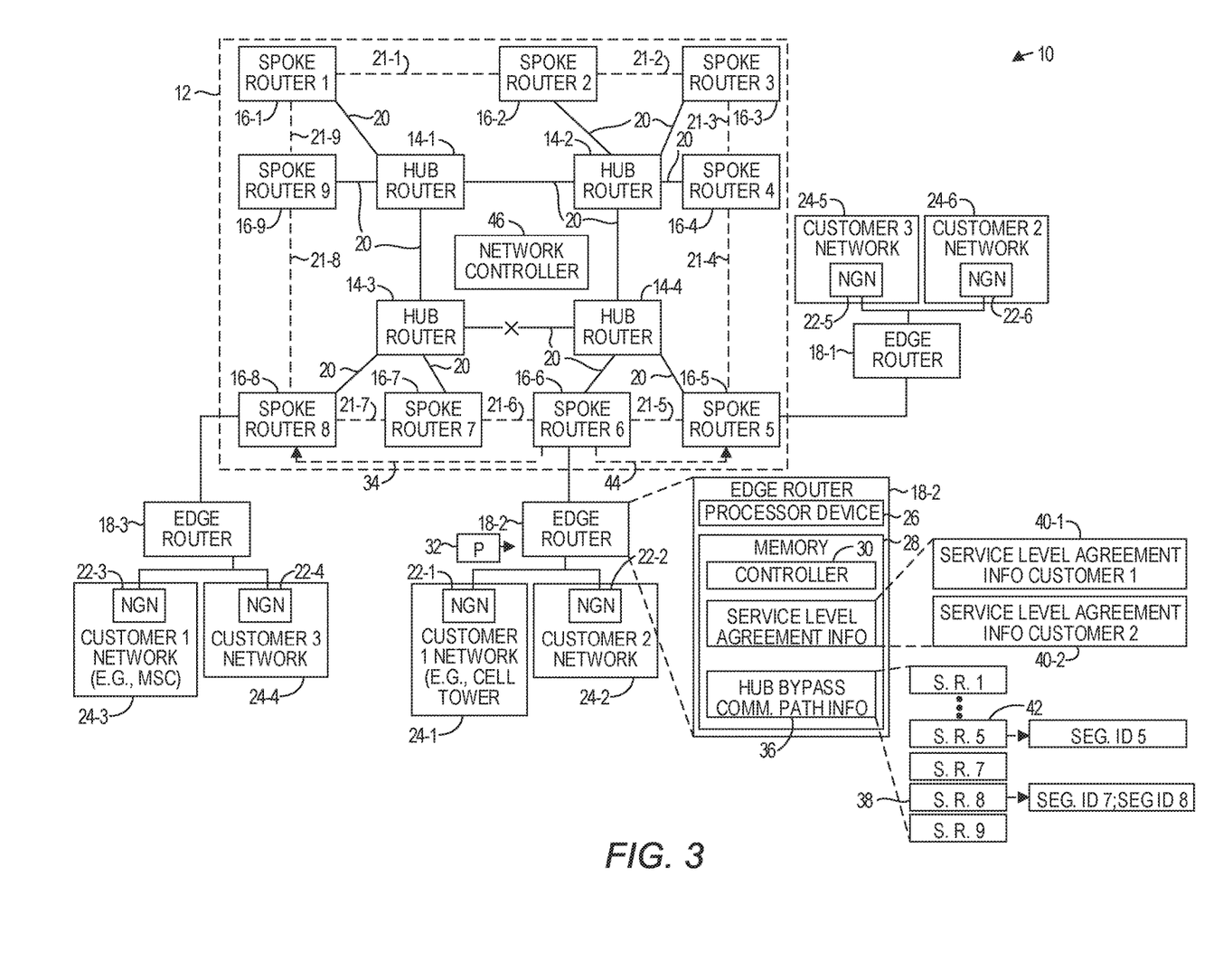
FIG. 3 is a block diagram of the hybrid hub-and-spoke communications network that includes hub-bypass communications paths illustrated in FIG. 1 in accordance with another embodiment.

FIG. 3 is a block diagram of the environment 10 that includes the hybrid hub-and-spoke network 12, in accordance with another embodiment. In this embodiment, the hybrid hub-and-spoke network 12 includes a network controller 46 that is communicatively coupled, directly or indirectly, to the hub routers 14-1-14-4 and the spoke routers 16-1-16-9. The network controller 46 includes a monitoring function that gathers data from the hub routers 14-1-14-4 and the spoke routers 16-1-16-9, and based on such data, can determine when one or more communication links 20, 21-1-21-9 are suffering from congestion, and which thus increases the latency of packets that travel over such one or more communication links 20, 21-1-21-9. In one embodiment, the network controller 46 issues alerts to the edge routers 18-1-18-3 identifying which communication links 20, 21-1-21-9 are currently suffering from congestion.

In one embodiment, based on the information received from the network controller 46, the edge router 18-3 determines that packets that are ordinarily communicated by the edge router 18-3 over a hub-traversing communications path of the hybrid hub-and-spoke network 12 will travel over a congested communications link 20, 21-1-21-9. Based on, for example, the service level agreement information 40-1, the edge router 18-3 determines that the packets that ordinarily travel over such hub-traversing communications path will no longer be delivered to the destination network gateway node 22 within a predetermined timeframe identified in the service level agreement information 40-1. In response, the edge router 18-3 identifies a hub-bypass communications path that avoids the one or more congested communications links 20, 21-1-21-9, and inserts one or more segment identifiers, which define the hub-bypass communications path, into a header of each packet. The edge router 18-3 may subsequently receive additional reports from the network controller 46 that indicate that the previously congested communications links 20, 21-1-21-9 are no longer congested. The edge router 18-3 may then return to communicating the packets over a hub-traversing communications path of the hybrid hub-and-spoke network 12.

In another embodiment, the network controller 46 is configured to detect communication faults or failures that completely disable a communications link. As an example, the network controller 46 may determine that the communications link 20 between the hub router 14-3 and the hub router 14-4 has suffered a fault and is no longer working, as indicated by an "X" in FIG. 3. The network controller 46 reports this information to the edge routers 18-1-18-3. The normal hub-traversing communications path taken by packets introduced onto the hybrid hub-and-spoke network 12 by the edge router 18-2 that are destined for the network gateway node 22-3 would travel from the spoke router 16-6 to the hub router 14-4, from the hub router 14-4 to the hub router 14-3, and from the hub router 14-3 to the spoke router 16-8 for delivery to the edge router 18-3 and the network gateway node 22-3. This hub-traversing communications path may be sufficiently fast to comply with the latency requirements identified in the service level agreement information 40-1. In view of the fault of the communications link 20 between the hub router 14-3 and the hub router 14-4, the backup hub-traversing communications path taken by packets introduced onto the hybrid hub-and-spoke network 12 by the edge router 18-2 that are destined for the network gateway node 22-3 would take a backup route that travels from the spoke router 16-6 to the hub router 14-4, from the hub router 14-4 to the hub router 14-2, from the hub router 14-2 to the hub router 14-1, from the hub router 14-1 to the hub router 14-3, and from the hub router 14-3 to the spoke router 16-8 for delivery to the edge router 18-3 and the network gateway node 22-3. This backup hub-traversing communications path may be hundreds or thousands of miles longer, and may no longer comply with the latency requirements identified in the service level agreement information 40-1. In response, the edge router 18-3 identifies a hub-bypass communications path that bypasses the hub routers 14-1-14-4 entirely, and inserts one or more segment identifiers in a header of each packet to define such hub-bypass communications path. The edge router 18-3 may subsequently receive additional reports from the network controller 46 that indicate that the fault has been fixed. The edge router 18-3 may then return to communicating the packets over a hub-traversing communications path of the hybrid hub-and-spoke network 12.

In some embodiments, rather than merely reporting information to the edge routers 18-1-18-3, the network controller 46 may send instructions to the edge routers 18-1-18-3 to use particular hub-bypass communications paths for certain packets, and which identify the particular hub-bypass communications paths via corresponding lists of segment identifiers. The edge routers 18-1-18-3 then utilize the provided lists of segment identifiers to route the packets via the corresponding hub-bypass communications paths.

Figure 4:
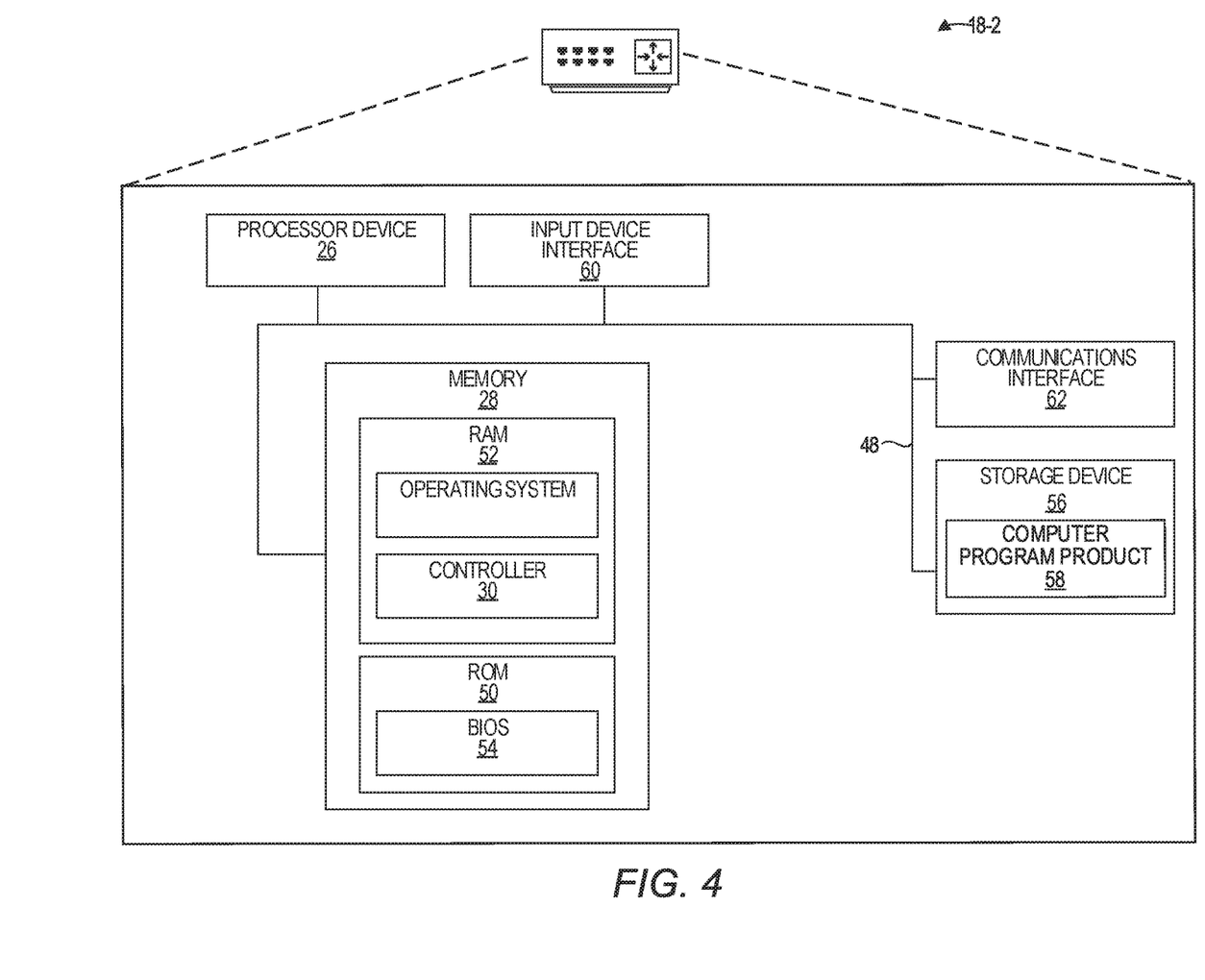
FIG. 4 is a block diagram of an edge router configured to operate in a hybrid hub-and-spoke communications network that includes hub-bypass communications paths in accordance with one embodiment.

FIG. 4 is a block diagram of the edge router 18-2 suitable for implementing examples according to one example. The edge router 18-2 may comprise any switching and/or routing device capable of including firmware, hardware, and/or executing software instructions to implement the functionality described herein. The edge router 18-2, in some embodiments, serves as an aggregation router that is coupled to a plurality of different external networks, and introduces packets originating in such external networks onto the hybrid hub-and-spoke network 12 for delivery to another external network. The edge router 18-2 includes the processor device 26, the memory 28, and a system bus 48. The system bus 48 provides an interface for system components including, but not limited to, the memory 28 and the processor device 26. The processor device 26 can be any commercially available or proprietary processor.

The system bus 48 may be any of several types of bus structures that may further interconnect to a memory bus (with or without a memory controller), a peripheral bus, and/or a local bus using any of a variety of commercially available bus architectures. The memory 28 may include non-volatile memory 50 (e.g., read-only memory (ROM), erasable programmable read-only memory (EPROM), electrically erasable programmable read-only memory (EEPROM), etc.), and volatile memory 52 (e.g., random-access memory (RAM)). A basic input/output system (BIOS) 54 may be stored in the non-volatile memory 50 and can include the basic routines that help to transfer information between elements within the edge router 18-2. The volatile memory 52 may also include a high-speed RAM, such as static RAM, for caching data.

The edge router 18-2 may further include or be coupled to a non-transitory computer-readable storage medium such as a storage device 56, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 56 and other drives associated with computer-readable media and computer-usable media may provide non-volatile storage of data, data structures, computer-executable instructions, and the like.

A number of modules can be stored in the storage device 56 and in the volatile memory 52, including an operating system and one or more program modules, such as the controller 30, which may implement the functionality described herein in whole or in part.

All or a portion of the examples may be implemented as a computer program product 58 stored on a transitory or non-transitory computer-usable or computer-readable storage medium, such as the storage device 56, which includes complex programming instructions, such as complex computer-readable program code, to cause the processor device 26 to carry out the steps described herein. Thus, the computer-readable program code can comprise software instructions for implementing the functionality of the examples described herein when executed on the processor device 26. The processor device 26, in conjunction with the controller 30 in the volatile memory 52, may serve as a controller, or control system, for the edge router 18-2 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 26 through an input device interface 60 that is coupled to the system bus 48 but can be connected by other interfaces such as a parallel port, an Institute of Electrical and Electronic Engineers (IEEE) 1394 serial port, a Universal Serial Bus (USB) port, an IR interface, and the like. The edge router 18-2 also includes a communications interface 62 suitable for communicating with other nodes, such as, by way of non-limiting example, the spoke router 16-6 and the network gateway nodes 22-1-22-2.

It will be understood that the discussion throughout the specification with regard to the functionality and composition of the edge router 18-2 applies equally to the edge routers 18-1 and 18-3.

Individuals will recognize improvements and modifications to the preferred examples of the disclosure. All such improvements and modifications are considered within the scope of the concepts disclosed herein and the claims that follow.

What is claimed is:

1. A method comprising:
 receiving, by an edge router from a first origination network gateway node, a first packet destined for a first destination network gateway node, wherein the edge router is communicatively coupled to a first spoke router, and the first spoke router is communicatively coupled to each of a plurality of other spoke routers via one or more hub routers, and is communicatively coupled to a second spoke router of the plurality of other spoke routers via a first hub-bypass communications path that does not traverse the one or more hub routers;
 determining, by the edge router, that the first packet is to be routed to the first destination network gateway node via the first hub-bypass communications path;
 adding one or more segment identifiers to a header of the first packet that defines the first hub-bypass communications path; and
 sending the header and the first packet to the first spoke router.

2. The method of claim 1 wherein determining that the first packet is to be routed to the first destination network gateway node via the first hub-bypass communications path further comprises:
 accessing service level agreement information that is associated with the first packet; and
 based at least in part on the first service level agreement information, determining that the first packet is to be routed to the first destination network gateway node via the first hub-bypass communications path.

3. The method of claim 2 further comprising:
 determining that the first packet contains a first type of data; and
 wherein determining that the first packet is to be routed to the first destination network gateway node via the first hub-bypass communications path comprises determining that the first packet is to be routed to the first destination network gateway node via the first hub-bypass communications path based on the service level agreement information and on the first type of data.

4. The method of claim 3 further comprising:
 receiving, by the edge router from the first origination network gateway node, a second packet;
 determining that the second packet is to be routed to the first destination network gateway node by a hub-traversing communications path; and
 sending the second packet to the first spoke router.

5. The method of claim 4 wherein determining that the second packet is to be routed to the first destination network gateway node by the hub-traversing communications path comprises:
 accessing the service level agreement information that is associated with the second packet; and
 based at least in part on the first service level agreement information, determining that the second packet is to be routed to the first destination network gateway node by the hub-traversing communications path.

6. The method of claim 5 further comprising:
 determining that the second packet contains a second type of data; and
 wherein determining that the second packet is to be routed to the first destination network gateway node by the hub-traversing communications path comprises determining that the second packet is to be routed to the first destination network gateway node by the hub-traversing communications path based on the service level agreement information and on the second type of data.

7. The method of claim 1 wherein adding the one or more segment identifiers to the header of the first packet comprises:
 adding a plurality of segment identifiers to the header of the first packet, each segment identifier directing a corresponding one of a plurality of spoke routers in a successive path of spoke routers from the first spoke router to the second spoke router to send the first packet to a next successive spoke router via the first hub-bypass communications path.

8. The method of claim 1 wherein determining, by the edge router, that the first packet is to be routed to the first destination network gateway node via the first hub-bypass communications path further comprises:
 receiving, by the edge router, information that indicates that a hub-traversing communications path between the first origination network gateway node and the first destination network gateway node is congested; and
 in response to the information, determining, by the edge router, that the first packet is to be routed to the first destination network gateway node via the first hub-bypass communications path.

9. The method of claim 1 wherein determining, by the edge router, that the first packet is to be routed to the first destination network gateway node via the first hub-bypass communications path further comprises:
 receiving, by the edge router, information that indicates that a hub-traversing communications path between the first origination network gateway node and the first destination network gateway node has a fault; and in response to the information, determining, by the edge router, that the first packet is to be routed to the first destination network gateway node via the first hub-bypass communications path.

10. The method of claim 1 wherein the first packet comprises a mobile device voice data packet and the first destination network gateway node comprises a mobile switching center.

11. The method of claim 1 further comprising:
receiving, by the edge router from a second origination network gateway node, a second packet destined for a second destination network gateway node;
determining, by the edge router, that the second packet is to be routed to the second destination network gateway node via a second hub-bypass communications path;
adding one or more segment identifiers to a header of the second packet that defines the second hub-bypass communications path; and
sending the header of the second packet and the second packet to the first spoke router.

12. The method of claim 1 further comprising:
receiving, by the edge router from a second origination network gateway node, a second packet destined for a second destination network gateway node;
determining, by the edge router, that the second packet is to be routed to the second destination network gateway node via a hub-traversing communications path; and
sending the second packet to the first spoke router.

13. The method of claim 1 wherein adding the one or more segment identifiers to the header that defines the first hub-bypass communications path further comprises:
accessing first hub-bypass communications path information that identifies a communications path of spoke routers between the edge router and the first destination network gateway node that does not traverse a hub-traversing communications path; and
extracting the one or more segment identifiers from the first hub-bypass communications path information.

14. An edge router, comprising:
a memory; and
a processor device coupled to the memory to:
receive, from a first origination network gateway node, a first packet destined for a first destination network gateway node, wherein the edge router is communicatively coupled to a first spoke router, and the first spoke router is communicatively coupled to each of a plurality of other spoke routers via one or more hub routers, and is communicatively coupled to a second spoke router of the plurality of other spoke routers via a first hub-bypass communications path that does not traverse the one or more hub routers;
determine that the first packet is to be routed to the first destination network gateway node via the first hub-bypass communications path;
add one or more segment identifiers to a header of the first packet that defines the first hub-bypass communications path; and
send the header and the first packet to the first spoke router.

15. The edge router of claim 14 wherein to determine that the first packet is to be routed to the first destination network gateway node via the first hub-bypass communications path, the processor device is further configured to:
access service level agreement information that is associated with the first packet; and
based at least in part on the first service level agreement information, determine that the first packet is to be routed to the first destination network gateway node via the first hub-bypass communications path.

16. The edge router of claim 14 wherein to add the one or more segment identifiers to the header of the first packet, the processor device is further configured to:
add a plurality of segment identifiers to the header of the first packet, each segment identifier directing a corresponding one of a plurality of spoke routers in a successive path of spoke routers from the first spoke router to the second spoke router to send the first packet to a next successive spoke router via the first hub-bypass communications path.

17. The edge router of claim 14 wherein to determine that the first packet is to be routed to the first destination network gateway node via the first hub-bypass communications path, the processor device is further configured to:
receive information that indicates that a hub-traversing communications path between the first origination network gateway node and the first destination network gateway node is congested; and
in response to the information, determine that the first packet is to be routed to the first destination network gateway node via the first hub-bypass communications path.

18. A computer program product stored on a non-transitory computer-readable storage medium and including instructions configured to cause a processor device of an edge router to:
receive, from a first origination network gateway node, a first packet destined for a first destination network gateway node, wherein the edge router is communicatively coupled to a first spoke router, and the first spoke router is communicatively coupled to each of a plurality of other spoke routers via one or more hub routers, and is communicatively coupled to a second spoke router of the plurality of other spoke routers via a first hub-bypass communications path that does not traverse the one or more hub routers;
determine that the first packet is to be routed to the first destination network gateway node via the first hub-bypass communications path;
add one or more segment identifiers to a header of the first packet that defines the first hub-bypass communications path; and
send the header and the first packet to the first spoke router.

19. The computer program product of claim 18 wherein to determine that the first packet is to be routed to the first destination network gateway node via the first hub-bypass communications path, the instructions further cause the processor device to:
access service level agreement information that is associated with the first packet; and
based at least in part on the first service level agreement information, determine that the first packet is to be routed to the first destination network gateway node via the first hub-bypass communications path.

20. The computer program product of claim 18 wherein to add the one or more segment identifiers to the header of the first packet, the instructions further cause the processor device to:

add a plurality of segment identifiers to the header of the first packet, each segment identifier directing a corresponding one of a plurality of spoke routers in a successive path of spoke routers from the first spoke router to the second spoke router to send the first packet to a next successive spoke router via the first hub-bypass communications path.

\* \* \* \* \*